No. 757,929. Patented April 19, 1904.

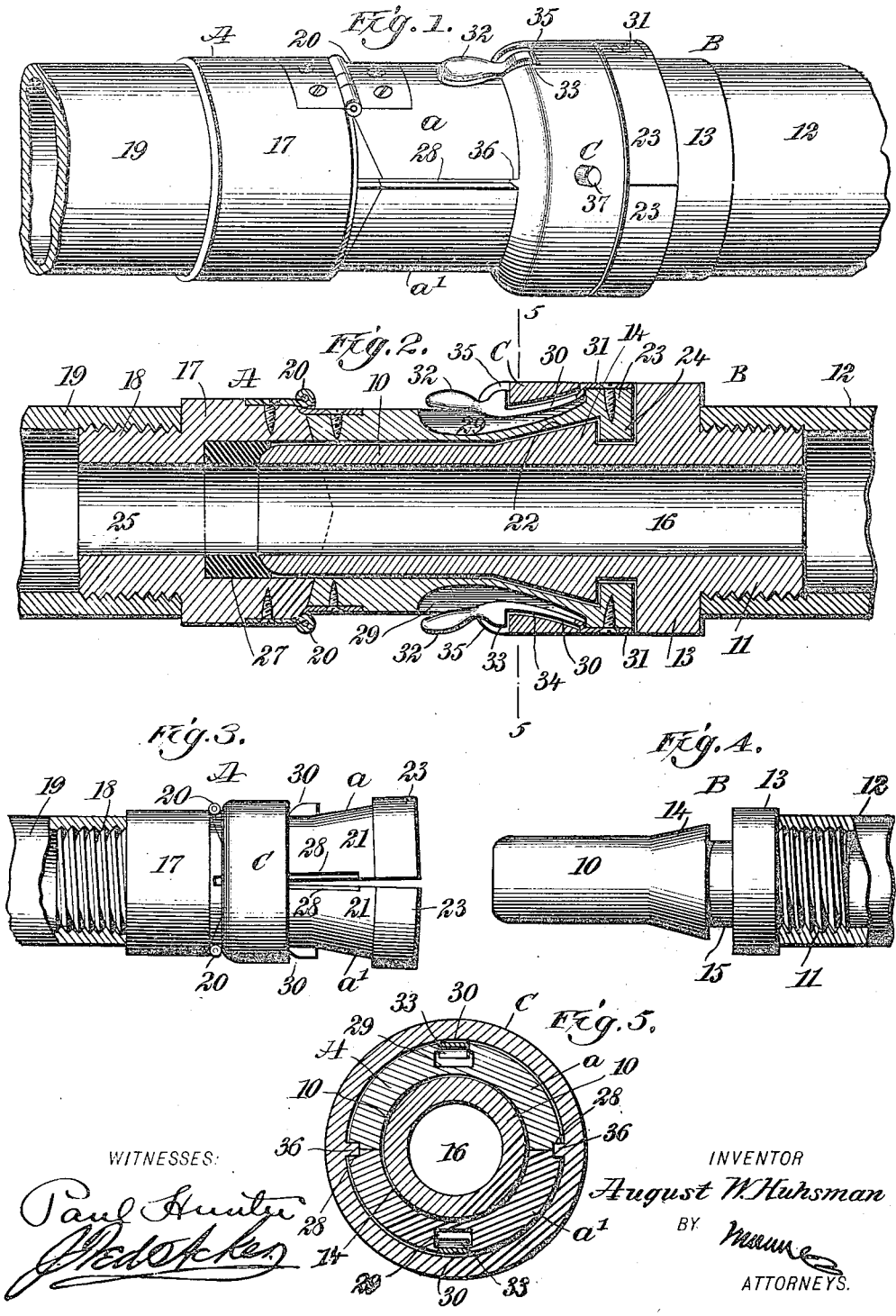

UNITED STATES PATENT OFFICE.

AUGUST WILLIAM HUHSMAN, OF STAUNTON, ILLINOIS.

HOSE, ROD, OR PIPE COUPLING.

SPECIFICATION forming part of Letters Patent No. 757,929, dated April 19, 1904.

Application filed July 8, 1903. Serial No. 164,696. (No model.)

*To all whom it may concern:*

Be it known that I, AUGUST WILLIAM HUHS-MAN, a citizen of the United States, and a resident of Staunton, in the county of Macoupin and State of Illinois, have invented a new and Improved Hose, Rod, or Pipe Coupling, of which the following is a full, clear, and exact description.

The purpose of my invention is to provide a hose, pipe, or rod coupling which will be exceedingly simple, durable, and economic and wherein the parts of the coupling are capable of being expeditiously and conveniently brought into locking engagement and as conveniently and rapidly disconnected, the coupling practically comprising two main parts and a locking-ring for said parts.

A further purpose of the invention is to so construct the coupling that no set-screws or threads are employed in connecting and disconnecting the parts and wherein there are no exterior projections liable to catch into articles in the event the coupling is dragged over a surface.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved coupling, the parts being locked together. Fig. 2 is a longitudinal section through the coupling, the parts being in the position shown in Fig. 1. Fig. 3 is a side elevation of the female section drawn on a smaller scale and shown in position to receive the male section, the pipe being broken away where it connects with the female section. Fig. 4 is a side elevation of the male section of the coupling, also drawn upon a smaller scale, the pipe connection therewith being broken away; and Fig. 5 is a transverse section taken practically on the line 5 5 of Fig. 2.

The coupling consists practically of a female section A, a male section B, and a locking-ring C, which is carried by the female section. The male section B consists of a tubular body 10 of suitable length, which at its outer end is provided with an enlarged shank portion 11, which shank portion is exteriorly threaded to receive the end of a pipe 12 or the socket of a rod when the coupling is to be applied to such article; but when the coupling is to be used in connection with a hose the shank 11 is roughened exteriorly in the customary manner, and the hose is clamped on the shank in the usual way.

At the inner end of the shank 11 an exterior collar 13 is formed on the body 10, and exteriorly of the said body 10, adjacent to the collar 13, a conical or inclined projection 14 is produced, the wider end of which faces the plain collar 13 on the said body, whereby an annular groove 15 is obtained between the two collars 13 and 14, and the bore 16 of the male section, as is shown in Fig. 2, is uniform in diameter throughout the length of the said section.

The female section A consists of a body part 17, integral with a reduced shank 18 at the outer end of the body 17, as is shown in Figs. 2 and 3. This shank 18 is exteriorly threaded when the coupling is used in connection with a rod or pipe 19 and is roughened when the coupling is to be used in connection with a hose. In addition to the aforesaid body 17 the female section A comprises an upper and a lower jaw $a$ and $a'$, which are hinged, respectively, to the upper and the lower portions of the body 17, as is shown at 20 in the drawings, and are adapted to close one upon the other or to open from each other, as is shown in Figs. 1, 2, and 3.

The inner or receiving end of each jaw is provided with an exterior conical surface 21, as is shown in Fig. 3, and an interior corresponding surface 22, as shown in Fig. 2, and at the extreme inner or receiving end of each jaw $a$ and $a'$ a segmental rib 23 is produced. Below the said rib at the interior of each jaw a segmental flange 24 is formed, as is also shown in Fig. 2.

The interior conical or inclined faces 22 of the jaws of the female section A are adapted to slide upon and to engage with the inclined or conical exterior projection 14 of the body of the male section B when the two sections are brought in coupled position, at which time the flanges 24 of the jaws enter the annular groove 15 between the projections or collars 13 and 14 of the body of the male section, as is also shown in Fig. 2.

The jaws *a* and *a'* at the back of the inclined or conical portions 21 are of uniform diameter, and back of a point where the interior conical faces 22 commence the interior diameter of the combined jaws is uniform, and a recess of corresponding diameter is made in the interior of the body 17 of the said female section well to the rear to receive a cushion 27 of elastic material. Otherwise the bore 25 of the body 17 of the female section A is the same as the diameter of the bore 16 of the male section, as is shown in Fig. 2. In the further construction of the jaws *a* and *a'* registering longitudinal recesses 28 are made in the outer faces of the said jaws at their meetings edges for a purpose to be hereinafter described.

At the top and the bottom of the conical exterior surfaces 21 of the jaws *a* and *a'* longitudinal recesses 29 are produced, which extend practically to the exterior ribs 23, as is shown in Fig. 2. Within each of the said recesses 29 a spring-latch 30 is located, the outer ends 31 whereof are screwed or otherwise secured to the exterior of the ribs 23, being more or less countersunk therein, as is also shown in Fig. 2. The inner end of each latch 30 terminates in a handle 32, and between the ends of each latch a locking-shoulder 33 is formed. Preferably the outer faces of the spring-latches 30 between the locking-shoulders 33 and the ribs 23 are more or less inclined or concaved, as is also shown in Fig. 2.

The locking-ring C, heretofore referred to, is adapted to slide on the jaws of the female section A, and the inner face 34 of the said locking-ring is inclined or is rendered conical to conform to the exterior conical surfaces 21 of the said jaws, as is illustrated also in Fig. 2, and at the top and bottom of the said locking-ring C a recess 35 is made in the inner edge of the said locking-ring, so that when the locking-ring is carried over the exterior conical surfaces 21 of the jaws *a* and *a'* the ring binds the said jaws together and the spring-latches 30 fly outward at their handle ends until their locking-shoulders 33 engage with the end walls of the aforesaid recesses 35, as is shown in Fig. 2.

In order that the locking-ring C shall not turn on the jaws *a* and *a'*, lugs 36 from the inner face of the ring enter the grooves 28, formed in the exterior of the jaws, as is shown in Figs. 1 and 5.

In the operation of the coupling to effect a union between the two sections A and B the locking-ring C of the female section A is released from the spring-latches 30 and is slipped back, allowing the jaws *a* and *a'* to separate, whereupon the male section B is introduced between the jaws of the female section and is forced inward until the inner end of the body of the male section B engages with the cushion 27 in the female section A, and the inner flange 24 of the female section enters the space 15 between the collars or offsets 13 and 14 on the male section, as is shown in Fig. 2. The locking-ring is then forced over the outer conical or inclined surfaces of the jaws *a* and *a'* until the shoulders 33 of the spring-latches 30 entering the recesses 35 in the locking-ring hold it in position and force the jaws *a* and *a'* to a close connection one with the other and the inner conical or inclined faces 22 of the jaws in engagement with the inclined or conical projection or collar 14 from the body 10 of the male section B, causing the inner flanges 24 on the jaws of the female section A to be locked in the recess 15 of the male section, thereby effecting a complete union between the two sections A and B.

Whenever the two sections A and B are to be uncoupled, it is simply necessary to press the handle end of the spring-latches 30 inward until they release the locking-ring C, whereupon the ring is slipped back toward the hinges 20 for the jaws, permitting the jaws *a* and *a'* to separate, and upon said separation the male section B may be quickly withdrawn from the female section A.

Teats or lugs 37 are formed upon the locking-ring C to be engaged by a spanner or equivalent tool, should such be employed to assist in locating or displacing the ring.

Having thus described my invention, I claim as new and desire to secure by Letters Patent—

1. In hose, rod and pipe couplings, a female section having receiving-jaws hinged for movement to and from each other, the said jaws having interior locking-flanges and a locking-ring adapted in one position to close the jaws, a male section having a body portion to enter the space between said jaws of the female section, and an exterior recess to receive the locking-flanges of the said female section, said jaw-section of the coupling having parallel sides at its hinged end and being conically enlarged at its forward end within the clamping-ring, the opening between said jaws near their forward ends being also correspondingly enlarged conically, and the rear end of the male member of the coupling being conically enlarged to snugly fit said internal conical enlargement near the outer end of the jaws, said locking-ring also having an inclined bore to fit the inclined face of the jaws, as described.

2. In hose, rod and pipe couplings, a female section comprising a body, jaws oppositely hinged to the body, latch devices carried by the jaws, the said jaws having their inner and outer faces inclined outwardly toward their receiving ends, being provided with interior locking-flanges at the receiving ends, a locking-ring for the jaws, conforming at its inner face with the exterior inclination of the jaws and adapted to be held in locking position by the said latches, and a male section, having a member adapted to enter between the jaws of the female section, which member is provided with an annular recess to receive the flanges of the jaws of the female section, and an exterior inclined projection to engage with the inner inclined surfaces of the said jaws, as described.

3. In hose, rod and pipe couplings, a female section comprising a body member, jaws hinged to the body member, adapted for movement to and from each other, the jaws being provided with interior segmental locking-flanges at their receiving ends, spring-latches carried by the said jaws at their exterior portion, having free movement at their rear or inner ends, a locking-ring mounted to slide on the said jaws and adapted in one position to close the jaws, the said locking-ring being provided with recesses which receive offsets from the spring-latches when the locking-ring is in locking position to hold the spring in such position, a male section having a member adapted to enter the space between the jaws of the female section and provided with an exterior annular recess adapted in the locking position of the two sections to receive the locking-flanges of the jaws of the female section, the two sections having a continuous bore of uniform diameter, as and for the purpose described.

4. In hose, rod and pipe couplings, the combination with a female section comprising a body member, jaws oppositely hinged to the said body member, which jaws are exteriorly and interiorly conically shaped at their receiving portions and are provided at their receiving ends with interiorly-formed locking-flanges, each jaw being provided with an exterior recess, spring-latches attached at one of their ends to the exterior receiving ends of the said jaws, the body portions of the latches being adapted to the said recesses, each latch having an outwardly-extending shoulder formed thereon, and a locking-ring mounted to slide on the jaws, having its inner face inclined to correspond to the conical exterior formation at the receiving end of the jaws, the said locking-ring being further provided with opposing recesses adapted to receive the offset portions of the said latches, of a male section provided with a body member adapted to enter the female section between the jaws thereof, a cushion located in the female section, receiving the inner end of the body member of the male section, a plain collar exteriorly formed on the body member of the male section near its outer end, and an opposing conically-formed collar likewise formed on the body member of the said male section, an annular space intervening the two collars, adapted for the reception of the flanges of the jaws of the female section when the two sections are in coupled position, all operating in the manner described.

5. In hose, rod and pipe couplings, the combination with a female section comprising a body member, jaws oppositely hinged to the said body member, which jaws are exteriorly and interiorly conically shaped at their receiving portions and are provided at their receiving ends with interiorly formed locking-flanges, each jaw being provided with an exterior recess, spring-latches attached at one of their ends to the exterior receiving ends of the said jaws, the body portions of the latches being adapted to the said recesses, each latch having an outwardly-extending shoulder formed thereon, and a locking-ring mounted to slide on the jaws, having its inner face inclined to correspond to the conical exterior formation at the receiving end of the jaws, the said locking-ring being further provided with opposing recesses adapted to receive the offset portions of the said latches, of a male section provided with a body member adapted to enter the female section between the jaws thereof, a cushion located in the female section, receiving the inner end of the body member of the male section, a plain collar exteriorly formed on the body member of the male section near its outer end, and an opposing conically-formed collar likewise formed on the body member of the said male section, an annular space intervening the two collars, adapted for the reception of the flanges of the jaws of the female section when the two sections are in coupled position, the said jaws of the female section having exterior, longitudinal recesses at their meeting edges, the locking-ring being provided with interior ribs adapted to slide in the said recesses, whereby the locking-ring is prevented from turning on the female section, and the recesses therein are compelled to register with the latches when the locking-ring is brought into or out of locking engagement with the said jaws, as described.

6. In hose, rod and pipe couplings, a female section having receiving-jaws hinged for movement to and from each other, the said jaws having interior locking-flanges, a locking-ring adapted in one position to close the jaws, a male section having a body portion to enter the space between said jaws of the female section, and an exterior recess to receive the locking-flanges of the said female section, spring-latches on said jaws for holding said ring in clamping engagement therewith, said ring having recesses into which said latches are received, and coöperating means between said jaws and clamping-ring to prevent rotatable movement of said ring upon said jaws to hold the recesses in said ring in alinement with their respective latches.

In testimony whereof I have signed my name to this specification in the presence of two subscribing witnesses.

AUGUST WILLIAM HUHSMAN.

Witnesses:
 THOS. MOSS, Jr.,
 JAMES MCEVOY.